United States Patent Office 2,832,779
Patented Apr. 29, 1958

2,832,779

PRODUCTION OF 4-ARYL-2.6-DIHYDROXY-1.3.5-TRIAZINES

Friedrich Ebel, Mannheim-Feudenheim, and Hans Weidinger, Ludwigshafen (Rhine), Germany, assignors to Badische Anilin- & Soda-Fabrik Aktiengesellschaft, Ludwigshafen (Rhine), Germany No Drawing. Application March 27, 1956
Serial No. 574,080

Claims priority, application Germany March 30, 1955

3 Claims. (Cl. 260—248)

This invention relates to improvements in manufacturing vat dyestuffs, and more particularly to the production of 4-aryl-2.6-dihydroxy-1.3.5-triazines.

German patent specifications Nos. 551,884 and 637,937 describe dyestuffs of the general formula:

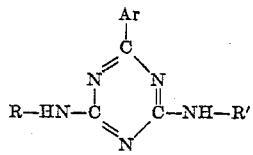

in which R and R' represent vattable radicals of the anthraquinone series and Ar an aromatic or a heterocyclic radical of aromatic character. These dyestuffs have very valuable properties but could not hitherto be used in practice because the method for their preparation given in each of the said patent specifications, namely the reaction of monoaryl-dihalogen-1.3.5-triazines with aminoanthraquinones, presupposed the ready accessibility of the said dihalogen-triazines. A possibility for the preparation of the said intermediate products resulted later by reacting dicyandiamide with carboxylic acid chlorides Ar-COCl or the corresponding anhydrides to form aroyl-dicyanamides (see U. S. patent specification No. 2,407,161), converting these into aroyl-biurets (see U. S. patent specification No. 2,401,599) and preparing from the latter by ring closure according to known methods 4-aryl-2.6-dihydroxytriazines in which, also by known methods, the hydroxyl groups are exchanged by chlorine atoms. This method of obtaining the said valuable dyestuffs is, however, still too troublesome to make possible a profitable manufacture of the dyestuffs.

We have now found that the dyestuffs of the above-mentioned kind are obtained in a simpler way by subjecting a 2.6-diamino-1.3.5-triazine substituted in 4-position by an aryl group or a heterocyclic group of the said kind (such as are obtained for example according to the German Patent Specification No. 731,309 by the reaction of a corresponding carboxylic acid nitrile with dicyandiamide in the presence of a strong base), preferably without isolating it, to saponification by caustic alkali solutions to form the corresponding 2.6-dihydroxy-1.3.5-triazine, converting this with phosphorus or sulfur halides in known manner into the 2.6-dihalogen-1.3.5-triazine and reacting the latter with 2 mols of an aminoanthraquinone or a vattable derivative of the aminoanthraquinones, preferably in the same reaction medium and in the presence of an acid-binding agent.

Starting from a nitrile of the general formula Ar-CN (Ar having the above significance), the new process can therefore be carried out in only two reaction vessels, in contrast to the troublesome known methods requiring many stages. Since nitriles of the said kind are often more readily accessible industrially than the corresponding carboxylic acid halides or anhydrides, the new process has considerably wider possibilities of use. Moreover it gives better total yields than the known methods, especially because the wasteful isolation of intermediate products is dispensed with. Furthermore it is surprising that the individual reaction stages of the new process should proceed so smoothly that they can be combined with each other without the occurrence of disturbances by side reactions which would be expected.

Suitable initial materials for the new process are, inter alia, the 2.6-diamino-1.3.5-triazines substituted in 4-position by a radical Ar (Ar having the above significance) and obtainable by the reaction of benzonitrile, naphthonitriles, cyanopyridines, cyanoquinolines, cyanocarbazoles, cyanothiazoles, cyanothiophenes or cyanothiazoles with dicyandiamide; as already stated the 4-stubstituted diamino triazines need not be isolated but can be directly saponified, for example with caustic soda solution, to the corresponding 4-substituted 2.6-dihydroxy-1.3.5-triazines. The said nitriles may contain substituents, such as alkyl groups, aryl groups, aralkyl groups, alkoxy groups, aryloxy groups, alkylsulfonyl groups, arylsulfonyl groups, sulfonamide groups and/or halogen atoms.

The transformation of the 4-substituted 2.6-dihydroxy-1.3.5-triazines (which are obtained by acidification of the saponification mixture) to the 2.6-dihalogen-1.3.5-triazines takes place for example by heating them in the presence or absence of indifferent media, such as nitrobenzene or ortho-chlor-benzene, with phosphorus pentachloride or pentabromide, thionyl chloride or phosphorus oxychloride, it being advantageous to add an acid-binding agent, such as dimethylaniline.

For reaction of the resultant 4-substituted 2.6-dihalogen-1.3.5-triazines to form dyestuffs there are suitable, inter alia 1- and 2-aminoanthraquinones and their halogen derivatives, 1-amino-x-methylsulfonylanthraquinones, 1-aminoanthraquinone - x - sulfonic - acid - dialkylamides, 1-amino- 4- or -5-aroylaminoanthraquinones, 1.4-diamino-2-acetyl-anthraquinone, 1-amino-4-alkoxyanthraquinones, 4 - amino - 1(N).2 - benzeneacridoneanthraquinone and its derivatives substituted in the benzenes nucleus by alkyl, alkylsulfonyl, sulfonamide or alkoxy groups or/and halogen atoms. For reaction with the 4-substituted 2.6-dihalogen-1.3.5-triazines, which, if they have been obtained in inert solvents need not be isolated as already stated, there may be used 2 molecules of the same aminoanthraquinone compound or 2 different ones which are introduced consecutively or in one operation.

The following examples will further illustrate this invention but the invention is not restricted to these examples. The parts are parts by weight.

*Example 1*

A mixture of 10 parts of potassium hydroxide, 100 parts of benzonitrile, 200 parts of glycol monomethyl ether and 100 parts of dicyandiamide is gradually heated while stirring to 90° to 100° C. until condensation to the 4-phenyl-2.6-diamino-1.3.5-triazine occurs with spontaneous heating. In the case of large batches, provision should be made for well cooling or the dicyandiamide should be added gradually. After the reaction has subsided, the whole is boiled for another 4 hours while stirring. It is then cooled to 90° to 100° C. and 400 parts of 50% caustic soda solution are allowed to flow in while continuing the stirring. Ammonia is thereby immediately evolved. Proportionally with this evolution, the temperature is raised by heating to 120° to 125° C. and the whole further stirred for 8 hours at this temperature. Towards the end of this time, the 4-phenyl-2.6-dihydroxy-1.3.5-triazine is precipitated as its crystalline disodium salt. The whole is then diluted at 90° C. with 4,000 parts of water and the cooled solution is filtered. 20% hydrochloric acid is added to the filtrate until it has been converted into a thick pasty mass by the separation of the monosodium salt of 4-phenyl-2.6-dihydroxy-1.3.5-triazine. Upon further addition of 10% hydrochloric acid until the pH value is about 4, the mass becomes mobile again. It is allowed to stand for 5 hours in order to complete the separation of the 4-phenyl-2.6-dihydroxy-1.3.5-triazine. It is filtered off by suction, washed with water and dried at 60° to 100° C. The yield is 176 parts, equivalent to 96% of the theoretical yield.

38 parts of this in 800 parts of nitrobenzene are heated at 100° to 110° C. with 92 parts of phosphorus pentachloride. The 4-phenyl-2.6-dihydroxy-1.3.5-triazine passes into solution after a few minutes with the evolution of hydrogen chloride. The phosphorus oxychloride formed is removed at reduced pressure. To the remaining solution of 4-phenyl-2.6-dichlor-1.3.5-triazine there are then added 92 parts of 1-aminoanthraquinone dissolved in 1,000 parts of nitrobenzene, and the whole is stirred for 3 hours at 120° C. It is then allowed to cool and the dyestuff is filtered off by suction, washed with methanol and dried. 108 parts of the dyestuff of the formula

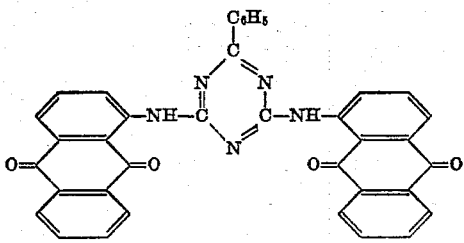

known from Example 1 of the German patent specification No. 551,884 are obtained.

*Example 2*

A mixture of 9 parts of potassium hydroxide, 100 parts of benzonitrile 190 parts of glycol monomethyl ether and 82 parts of dicyandiamide is gradually heated to 90° to 100° C. while stirring until condensation to 4-phenyl-2.6-diamino-1.3.5-triazine commences with spontaneous heating. After the reaction has subsided the whole is boiled for 4 hours while stirring. 480 parts of 50% caustic soda solution are added at 90° to 100° C. and the whole is stirred for 8 hours at 120° to 125° C. It is diluted with 4,000 parts of water, and carbon dioxide is led into the filtered solution at room temperature until there is no further separation of the monosodium salt of 4-phenyl-2.6-dihydroxy-1.3.5-triazine. It is filtered off by suction, the salt dissolved at 40° C. in 8,000 parts of water and weakly acidified with glacial acetic acid (pH=6). After standing for several hours, the well crystallized 4-phenyl-2.6-dihydroxy-1.3.5-triazine is filtered off, washed with a little water and dried at 60° to 100° C. The yield amounts to 149 parts, equivalent to 81% of the theoretical yield.

150 parts of the product thus obtained are introduced into a mixture of 360 parts of phosphorus pentachloride and 150 parts of phosphorus oxychloride and heated while stirring under reflux until all has dissolved giving a clear solution. After stirring further for an hour at boiling temperature, it is allowed to cool while stirring. The cold mobile reaction mixture is forced from the reaction vessel while stirring into a mixture of 14,000 parts of ice and water. After slow stirring for 30 to 45 minutes, the 4-phenyl-2.6-dichlor-1.3.5-triazine which has been obtained in crystalline form is brought onto a suction filter, washed with a large amount of water and dried at 30° to 40° C. at reduced pressure. For purification it is dissolved in 5 times the amount by weight of trichlorethylene at about 50° C., the solution allowed to cool and amorphous impurities filtered off. By evaporating the filtrate, very pure 4-phenyl-2.6-dichlor-1.3.5-triazine is obtained.

60.5 parts of 4-phenyl-2.6-dichlor-1.3.5-triazine are stirred for 3 hours at 170° C. with 150 parts of 1.4-diamino-2-acetylanthraquinone and 2,200 parts of trichlorbenzene. After cooling, the dyestuff formed is filtered off by suction, washed with methanol and dried. 163 parts of a blue dyestuff of the formula

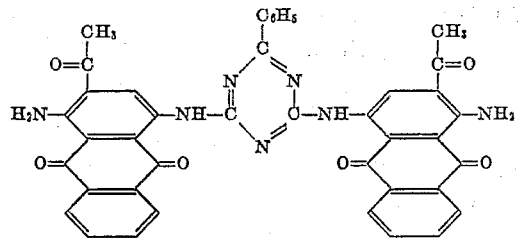

are obtained which dyes cotton brilliant reddish-blue shades from a dark grey-green vat.

*Example 3*

18.9 parts of the 4-phenyl-2.6-dihydroxy-1.3.5-triazine obtained according to the first paragraph of either Example 1 or Example 2 are stirred with 44 parts of phosphorus pentachloride in 800 parts of nitrobenzene at 100° to 120° C. until all has passed into solution. The phosphorus oxychloride formed is distilled off under reduced pressure. 56 parts of 1.4-diamino-2-acetylanthraquinone are added to the remaining solution and stirred for 3 hours at 170° C. After cooling, the dyestuff formed is filtered off by suction, washed with methanol and dried. The yield amounts to 61 parts. The dyestuff is identical with that prepared according to paragraph 3 of Example 2.

A dyestuff of similar brilliance is obtained by using, instead of 4-phenyl-2.6-dihydroxy-1.3.5-triazine, the 4-(3'-tolyl)-2.6-dihydroxy-1.3.5-triazine prepared in an analogous manner.

*Example 4*

A solution of 79 parts of 4-phenyl-2.6-dichlor-1.3.5-triazine in 800 parts of nitrobenzene is prepared according to Example 1 and there is added thereto a solution of 250 parts of 1-amino-5-benzoylaminoanthraquinone in 4,000 parts of nitrobenzene at 50° C. The whole is then stirred for 3 hours at 120° C., allowed to cool, the resultant dyestuff of the formula

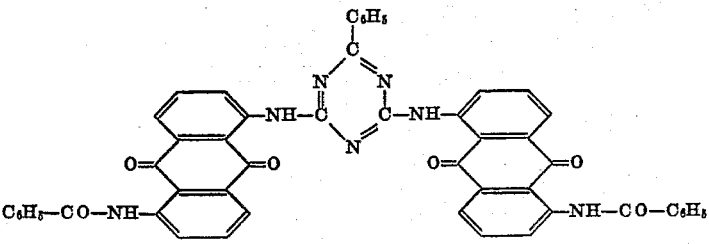

is filtered off by suction, washed with methanol and dried. The yield amounts to 260 parts. The dyestuff, obtained as an orange colored powder, dyes cotton brilliant orange-yellow shades from a dark red vat.

*Example 5*

130 parts of ortho-methoxybenzonitrile are reacted with 100 parts of dicyandiamide and 15 parts of potassium hydroxide in 200 parts of glycol monomethyl ether in accordance with the statements in Example 1. After the reaction has subsided, it is stirred for 3 hours at boiling temperature. Then 300 parts of 50% caustic soda solution are allowed to flow in at 90° C., the whole is again brought to boiling and stirred until the evolution of ammonia has ceased. It is then diluted at 80° C. with 6,000 parts of water. To the filtered solution there is first added 20% hydrochloric acid until the mass has become thick and then 10% hydrochloric acid until an acid reaction against litmus is obtained. After then allowing to stand for 5 hours, the 4-(2'-methoxyphenyl)-2.6-dihydroxy-1.3.5-triazine is filtered off by suction, washed with a little water and dried. The yield amounts to 88% of the theoretical yield.

132 parts of this compound are heated with 600 parts of phosphorus oxychloride and 280 parts of phosphorus pentachloride under reflux until all has passed into solution. The phosphorus oxychloride (400 parts) is then distilled off at reduced pressure and the cooled semisolid mass is stirred into 3,000 parts of ice-water. After stirring for half an hour, the precipitate is collected on a suction filter and washed thoroughly with water. It is dried at about 40° C. at reduced pressure. The crude 4-(2'-methoxyphenyl)-2.6-dichlor-1.3.5-triazine thus obtained is used directly for the production of dyestuffs. By dissolution in and reprecipitation from ortho-dichlorbenzene the pure compound of the melting point 134° to 135° C. can be obtained therefrom in 80% yield.

14.4 parts of the crude product are dissolved in 80 parts of nitrobenzene, filtered free from the slight insoluble deposit and mixed at 50° C. with a solution, heated to 50° C., of 29 parts of 1-amino-4-methoxyanthraquinone in 420 parts of nitrobenzene. The whole is heated to 110° C. and this temperature is maintained for 3 hours while stirring continuously. The dyestuff precipitated after cooling as copper red crystals is filtered off by suction and washed with methanol. It is indentical with the dyestuff of the formula

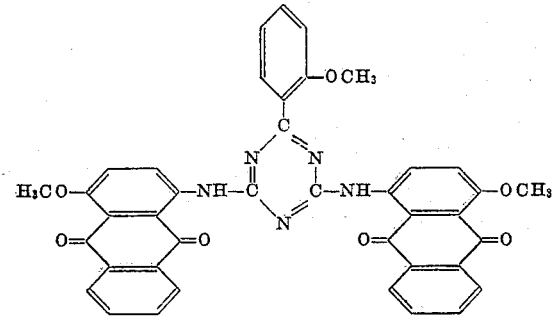

known from Example 2 of the German patent specification No. 637,937. The yield amounts to 32 parts. It dyes cotton brilliant scarlet shades from a pale red vat.

*Example 6*

A mixture of 13.7 parts of ortho-chlorbenzonitrile, 9.2 parts of dicyandiamide, 1.5 parts of potassium hydroxide and 20 parts of ethylene glycol monomethyl ether is boiled for 3 hours under reflux. It is allowed to cool to about 90° C.; then 40 parts of 50% caustic soda solution are added and the whole is boiled for 9 hours. It is then diluted at 90° C. with 800 parts of water and the cooled solution is filtered. 20% hydrochloric acid is added to the filtrate until the pH value 4 is reached. After standing for 5 hours, the crystalline precipitate is filtered off by suction, washed with a little water and dried at 60° to 100° C. The yield of 4-(2'-chlorphenyl)-2.6-dihydroxy-1.3.5-triazine amounts to 84% of the theoretical yield.

56 parts of 4-(2'-chlorphenyl)-2.6-dihydroxy-1.3.5-triazine are heated with 115 parts of phosphorus pentachloride and 180 parts of phosphorus oxychloride while stirring under reflux until all has dissolved to give a clear solution. After stirring for a further hour at boiling temperature it is allowed to cool. The reaction mixture is forced from the reaction vessel into a stirred mixture of 4,000 parts of ice and water. After stirring for 45 minutes, the crystalline 4-(2'-chlorphenyl)-2,6-dichlor-1.3.5-triazine is filtered off by suction, washed thoroughly with water and dried at 30° to 40° C. The product can be purified by dissolution in and reprecipitation from trichlorethylene as described in the second paragraph of Example 2. The compound thus obtained in a yield of 58 parts melts at 152° to 154° C.

26 parts of 4-(ortho-chlorphenyl)-2.6-dihydroxy-1.3.5-triazine are heated with 56 parts of 1.4-diamino-2-acetylanthraquinone and 90 parts of nitrobenzene for 2 hours while stirring at 170° C. After cooling, the dyestuff is filtered off by suction, washed with methanol and dried. 54 parts of a blue dyestuff of the formula

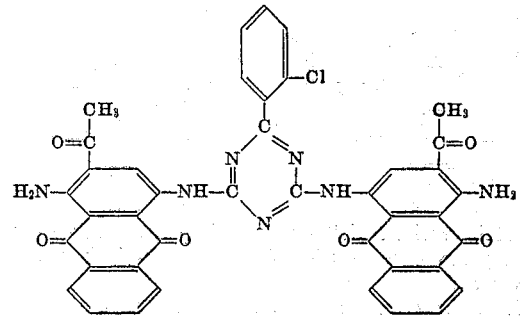

are obtained which dyes cotton reddish-blue shades from a grey-green vat.

*Example 7*

A solution of 22.6 parts of 4-phenyl-2.6-dichlor-1.3.5-triazine in 1,500 parts of anhydrous nitrobenzene is prepared in a manner similar to that described in Example 1. To this solution 34.2 parts of 1-amino-4-benzoylaminoanthraquinone are added and the mixture is heated to 110° C. in the course of one hour while stirring. The mixture is kept stirring at this temperature for 3 hours, then 28 parts of 1.4-diamino-2-acetylanthraquinone are added and the temperature is rapidly raised to 150° C. Stirring is continued at this temperature for 2 hours, then the mixture is allowed to cool to about 100° C. when the dyestuff is filtered off by suction and washed with nitrobenzene and methanol. 71 parts of a blue-black dyestuff having the formula.

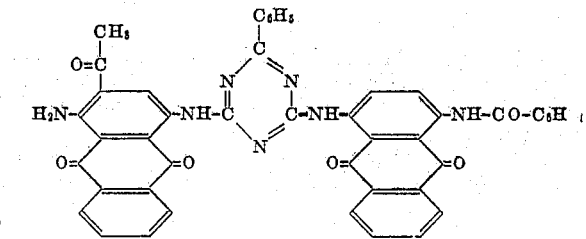

are obtained which dyes cotton deep violet shades from a deep brown-red vat.

*Example 8*

Using the same procedure as in the preceding example 34.2 parts of 1-amino-5-benzoylaminoanthraquinone are used instead of 1-amino-4-benzoylaminoanthraquinone. 70 parts of a vat dyestuff having the formula

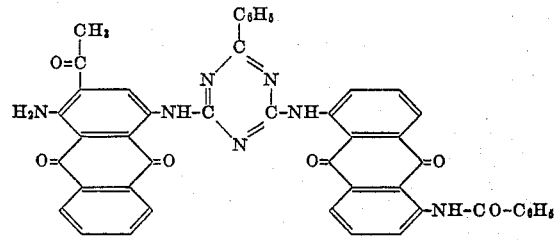

are obtained which dyes cotton deep olive-green shades.

Example 9

A solution of 22.6 parts of 4-phenyl-2.6-dichlor-1.3.5-triazine in 1,200 parts of anhydrous nitrobenzene is prepared in a manner similar to that described in Example 1. To this solution 22.3 parts of 1-aminoanthraquinone are added. Then the mixture is heated to 120° C. in the course of one hour while stirring. After stirring for 3 more hours at this temperature, 28 parts of 1.4-diamino-2-acetylanthraquinone are added, the temperature is raised to 150° C. and stirring is continued at this temperature for 2 hours. After cooling to about 100° C. the dyestuff is filtered off by suction and washed first with nitrobenzene and then with methanol. A dyestuff having the following formula

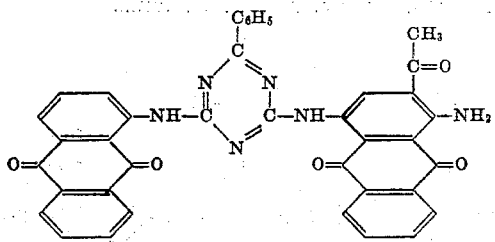

is obtained with a yield of about 60 parts. It dyes cotton clear yellow-green shades from a brown-black vat.

We claim:
1. An improved process for the production of a 4-aryl-2.6-dihydroxy-1.3.5-triazine of the general formula

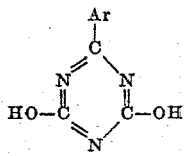

in which Ar represents an aryl group selected from the class consisting of the phenyl, the tolyl, the methoxyphenyl and the chlorophenyl groups, which process comprises heating a 4-aryl-2.6-diamino-1.3.5-triazine of the general formula

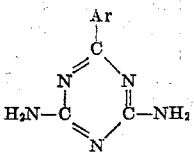

in which Ar has the meaning indicated above with about a 50 percent aqueous caustic alkali solution at about 90° C. up to about 125° C. until no more ammonia is split off.

2. An improved process for the production of 4-aryl-2.6-dihydroxy-1.3.5-triazines of the general formula

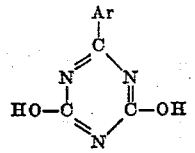

in which Ar represents an aryl group selected from the class consisting of phenyl, tolyl, methoxyphenyl and the chlorophenyl groups, which process comprises heating a 4-aryl-2.6-diamino-1.3.5-triazine of the general formula

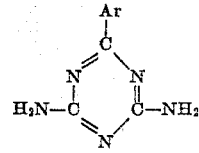

in which Ar has the meaning indicated above with a strong, aqueous solution of caustic alkali at temperatures betwen about 90° C. and 125° C. until no more ammonia is split off.

3. In an improved process for the production of a 4-aryl-2.6-hydroxy-1.3.5-triazine of the general formula

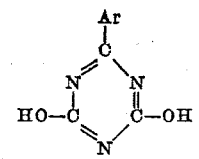

in which Ar is an aryl group selected from the class consisting of phenyl, tolyl, methoxyphenyl, and chlorophenyl groups from a 4-aryl-2.6-diamino-1.3.5-triazine of the general formula

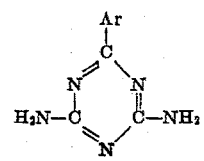

in which Ar has the meaning indicated above, wherein said diaminotriazine is derived by condensing dicyandiamide with an aromatic nitrile selected from the class consisting of benzonitrile, methylbenzonitrile, methoxybenzonitrile, and chlorobenzonitrile, the improvement comprising directly reacting the diamino-triazine in the condensation mixture, without isolating said diamino-triazine, with a strong aqueous solution of caustic alkali at a temperature between about 90° C. and 125° C. until no more ammonia is split off.

References Cited in the file of this patent

UNITED STATES PATENTS

| | | |
|---|---|---|
| 2,302,162 | Zerweck et al. | Nov. 17, 1942 |
| 2,691,020 | Gadea et al. | Apr. 10, 1953 |
| 2,735,849 | Ebel et al. | Feb. 21, 1956 |

FOREIGN PATENTS

| | | |
|---|---|---|
| 499,477 | Great Britain | June 24, 1936 |
| 691,506 | Great Britain | May 13, 1953 |
| 691,507 | Great Britain | May 13, 1953 |

(Corresponding U. S. 2,719,154, Sept. 27, 1955)